United States Patent
Suzuki

(10) Patent No.: US 6,917,583 B2
(45) Date of Patent: Jul. 12, 2005

(54) INFORMATION TRANSMISSION NETWORK SYSTEM AND ITS TRAFFIC CONTROL METHOD AND NODE EQUIPMENT

(75) Inventor: Masatoshi Suzuki, Fussa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 867 days.

(21) Appl. No.: 09/788,593

(22) Filed: Feb. 21, 2001

(65) Prior Publication Data

US 2001/0015955 A1 Aug. 23, 2001

(30) Foreign Application Priority Data

Feb. 21, 2000 (JP) .................................. 2000-043201

(51) Int. Cl.$^7$ .............................................. G01R 31/08
(52) U.S. Cl. ................................. 370/223; 714/2
(58) Field of Search ............................. 370/222, 223, 370/224; 714/2, 13

(56) References Cited

U.S. PATENT DOCUMENTS

| | | | | |
|---|---|---|---|---|
| 5,216,666 A | * | 6/1993 | Stalick | 370/222 |
| 5,790,520 A | * | 8/1998 | Iwamoto et al. | 370/223 |
| 5,793,746 A | * | 8/1998 | Gerstel et al. | 370/228 |
| 5,815,490 A | * | 9/1998 | Lu | 370/223 |
| 6,567,194 B1 | * | 5/2003 | Badr | 398/1 |
| 6,616,350 B1 | * | 9/2003 | de Boer et al. | 398/9 |
| 6,657,952 B1 | * | 12/2003 | Shimomura et al. | 370/223 |

* cited by examiner

Primary Examiner—Ricky Ngo
Assistant Examiner—Christine Ng
(74) Attorney, Agent, or Firm—Oblon, Spivak, McClelland, Maier & Neustadt, P.C.

(57) ABSTRACT

In SDH-based transmission systems with redundancy, in the event of failure in the service transmission lines, before the service traffic communication path set in the service transmission lines is switched to the protection transmission lines, if there is a communication path for sub traffic set in the protection transmission lines, the AU-AIS signal is inserted at the exit to lower-tier terminals to terminate the sub traffic communication path. Unless there is a communication path set for sub traffic in the protection transmission lines, the UNEQ signal is inserted at the exit to lower-tier terminals which are substantially connected to the protection transmission lines to terminate the sub traffic communication path. Later, the service traffic communication path is switched to the protection transmission lines. Then a misconnect during redundancy lines switching is prevented and the possibility of leak of the service traffic transmission information is eliminated.

3 Claims, 6 Drawing Sheets

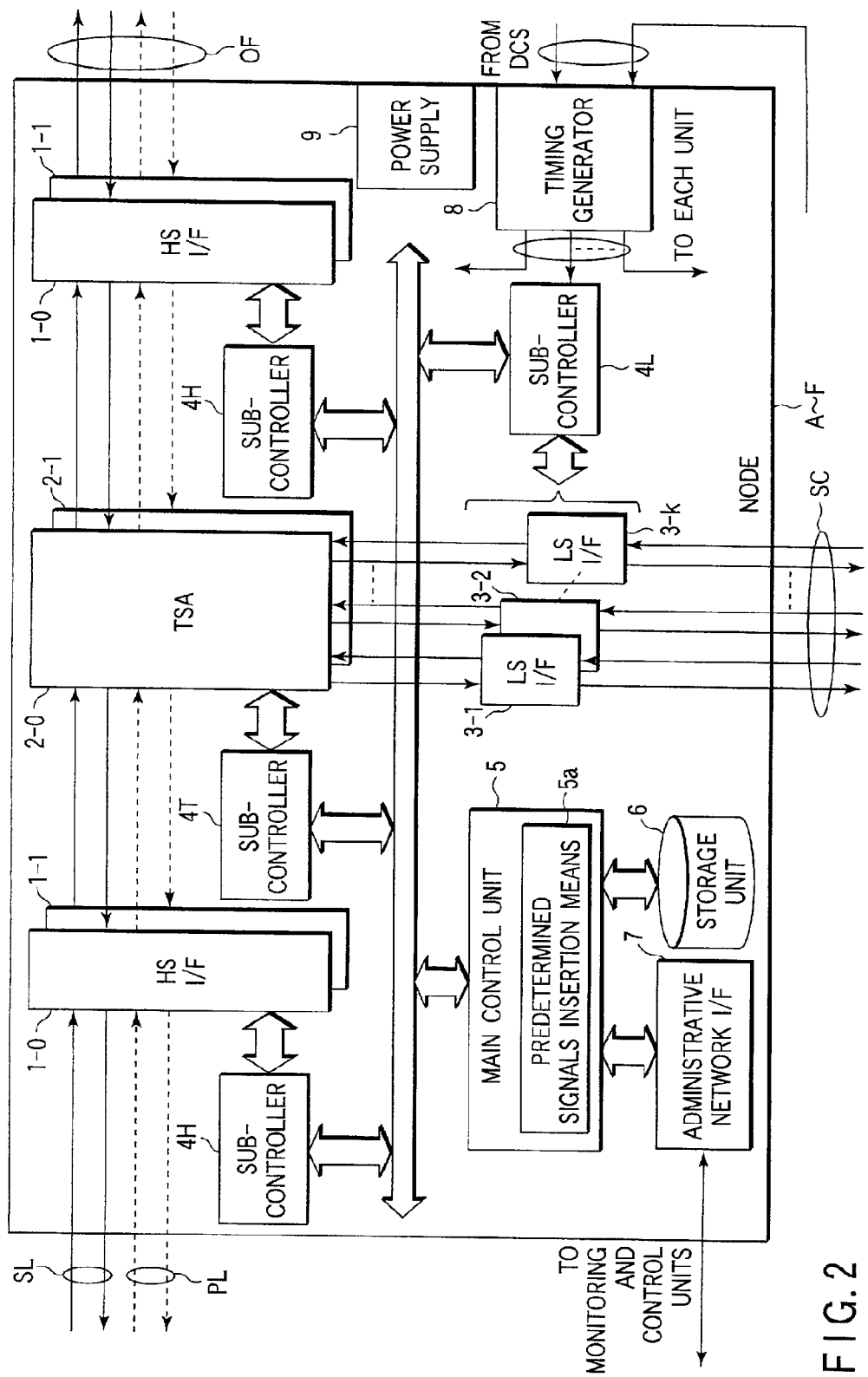
F I G. 2

INFORMATION TRANSMISSION NETWORK SYSTEM AND ITS TRAFFIC CONTROL METHOD AND NODE EQUIPMENT

CROSS-REFERENCE TO RELATED APPLICATIONS

This application is based upon and claims the benefit of priority from the prior Japanese Patent Application No. 2000-043201, filed Feb. 21, 2000, the entire contents of which are incorporated herein by reference.

BACKGROUND OF THE INVENTION

The present invention relates to information transmission network systems complying with standardized methods such as SDH (Synchronous Digital Hierarchy) and SONET (Synchronous Optical Network) and node equipment for use in those network systems, and particularly to a control technology for switching between the service lines and the protection lines.

In recent years, a variety of high speed data transmission services for information transmission network systems have been proposed along with intensive relevant technological developments. For the implementation of high speed transmission services, multiplexing methods have to be standardized so that existing low speed transmission services may also be multiplexed together in the same lines used for high speed services. SONET and SDH are examples of such standardized methods. Note that SONET is America's proprietary technique related to SDH.

In many cases, SONET/SDH-based information transmission network systems (hereafter, SONET/SDH transmission systems) have adopted a redundancy configuration having both service and protection lines for their interface equipment and transmission paths inside the node equipment. Under this redundant configuration, the communication path that has been set in the service line for service traffic can be switched to the protection line in case of failure in the service line. Service reliability is thereby maintained even in the events of failure and breaks in lines.

In some of such redundant SONET/SDH transmission systems, the protection line is vacant during normal operation of the service line. For this reason, the traffic capacity of the whole network is raised by setting a communication path in the protection line in order to accommodate another flow of traffic. This traffic that travels in the communication path in the protection line includes part-time traffic (hereafter, P/T traffic) and the extra traffic defined by the ITU-T Recommendations. Information carried in the P/T traffic is handled as its transmission may be discarded temporarily. This is because the communication path for the service traffic set in the service line can be instantaneously switched to the protection line by releasing the protection line in case of failure in the service line.

This service/protection lines switching function for the case of a system failure is referred to as APS (Automatic Protection Switching) in SDH. The details of APS have been described in the ITU-T Recommendation G.841 (latest revised, October/1998). As described in this recommendation, in case of a failure, each node on the network automatically switches between the service and protection lines by rewriting K1, K2 bytes (hereafter, K-byte) defined in the overhead of each SDH transmission frame and exchanging these rewritten signals to recognize the occurrence of a failure.

During the service/protection lines switching in the event of a problem in the communication path set in the service transmission line, the communication path is switched to the protection line to save the information in the service traffic. At this switching operation, error connections (so called misconnect) of the service traffic should be prevented. In the event of a misconnect, the information carried in the service traffic may be leaked to an undesired party, causing serious data security problems.

Therefore, the ITU-T G.841 Recommendation makes it a rule to insert a predetermined signal called AU-AIS (Administrative Unit-Alarm Indication Signal) at the exit to lower-order groups, which is the exit of the existing P/T traffic path in the protection line, prior to the traffic switching to the protection line. Then the parties connected to this communication path cannot interpret the delivered information and eventually the P/T traffic path is terminated. Namely, since the service traffic communication path is changed after the P/T traffic path has been terminated in SONET/SDH transmission systems, it is ensured that the information in the service traffic is not leaked to the destinations of the P/T traffic path. Note that "AU-AIS" is a name used in the SDH Standards.

On the other hand, the above recommendation has not identified a rule applied to the protection line that does not have a P/T traffic communication path. However, it is possible that the protection line is connected to multiplexes and communication units (hereafter, lower-tier terminals) existing on the lower-tier side in each node, substantially forming communication paths with such lower-tier terminals. Then, if the service traffic communication path is switched to a protection line having no P/T traffic path, a misconnect can be made to a party existing on the substantially established communication path and the information in the service traffic may be leaked to this party.

BRIEF SUMMARY OF THE INVENTION

It is, therefore, the object of this invention to provide an information transmission network system and its traffic control method and node equipment, which ensure to prevent a misconnect of the service traffic communication path during service/protection lines switching and eliminate the leak of information in the service traffic to an undesired party and thereby provide high reliability against failure and line breaks.

According to the present invention, there is provided an information transmission network system comprising: a plurality of node units each accommodating at least one lower-tier terminal, and service transmission lines and protection transmission lines interconnecting the node units; wherein the node units comprise: a normal operating means for transmitting information in the main traffic by setting a main traffic communication path in the service transmission lines and transmits information in the sub-traffic by setting a sub-traffic communication path, if necessary, in the protection transmission lines, a failure detection means for detecting failure in the service transmission lines, and a backup operating means for inserting a predetermined signal, when a failure has been detected by the detection means, at every exit to lower-tier terminals substantially connected to the protection transmission lines and then switches the main traffic communication path set in the failed service transmission lines to the protection transmission lines.

According to the present invention, there is provided a traffic control method for use in network systems having a plurality of node units each accommodating at least one lower-tier terminal and service transmission lines and protection transmission lines interconnecting the node units, comprising: a step of detecting failure in the service transmission lines; a step of normal operation that, when no failure is detected in the failure detection step, transmits information in the main traffic by setting a main traffic communication path in the service transmission lines and transmits information in the sub-traffic by setting a sub-traffic communication path, if necessary, in the protection transmission lines; a step of backup operation that, when a failure is detected in the failure detection step, inserts a predetermined signal at the exit to lower-tier terminals substantially connected to the protection transmission lines; and a step of switching the main traffic communication path set in the failed service transmission lines to the protection transmission lines, after the predetermined signal has been inserted.

According to the present invention, there is provided in node units for use in information transmission network systems that have a plurality of node units each accommodating at least one lower-tier terminal, connect node units with service transmission lines and protection transmission lines, during normal operations, carry main traffic information through a main traffic communication path set in the service transmission lines, and carry sub-traffic information through a sub-traffic communication path, if necessary, set in the protection transmission lines, the node unit comprising: a transmitted information exchange unit that transmits and receives information through a predetermined communication path selectively between the service transmission lines and protection transmission lines; at least one interface unit for the lower-tier terminals that is each mounted in the at least one lower-tier terminal and transmits and receives information between the corresponding lower-tier terminals and the transmitted information exchange unit; and a control unit that monitors the service transmission lines and protection transmission lines for failure, and, upon the detection of failure in the service transmission lines, terminates the communication path substantially connected to the protection transmission lines by making the interface unit for lower-tier terminals send predetermined signals to lower-tier terminals and then makes the transmitted information exchange unit switch the main traffic communication path to the protection transmission lines.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a function block diagram illustrating the major parts of nodes A–F employed in an SDH transmission system according to the present invention.

DETAILED DESCRIPTION OF THE INVENTION

The preferred embodiments of the present invention will be described in detail below with reference to accompanying drawings. Although those embodiments are explained with reference to STM (Synchronous Transfer Mode) of the SDH standards, such explanations apply to SONET almost in the same manner. Note that in the descriptions that follow the terms "service traffic" and "P/T traffic" are used to indicate main traffic and sub traffic, respectively. The sub traffic includes the Extra Traffic and the P/T traffic.

Figure 1:
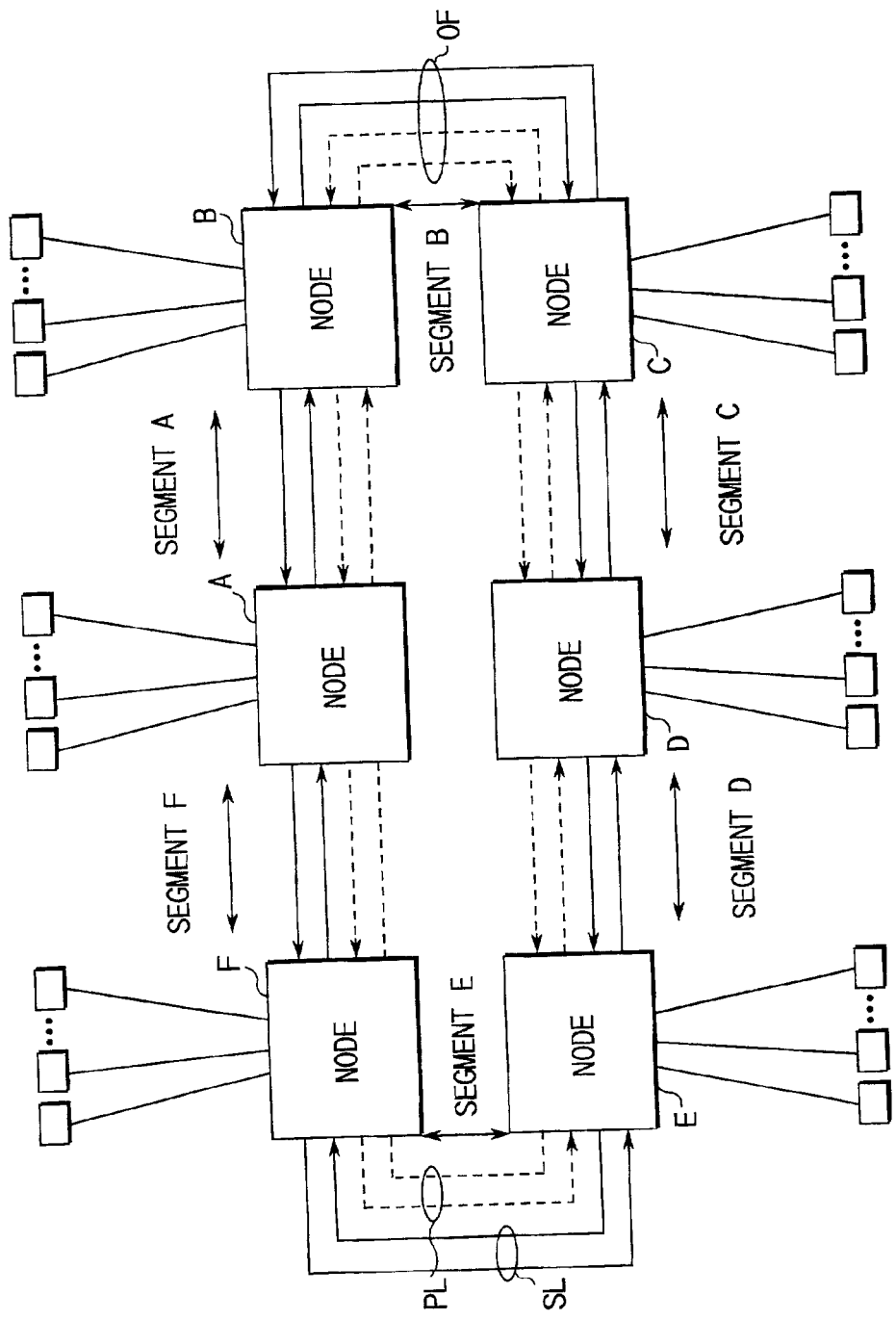
FIG. 1 is a system configuration illustrating an embodiment of the SDH transmission system according to the present invention.

FIG. 1 shows a configuration of the SDH transmission system according to the present invention. This system is made of a plurality (six in this example) of nodes A–F connected to form a ring network via a high speed synchronous multiplex circuit OF (hereafter, high speed circuit) such as STM-N (N is 16, 64 or more). This high speed circuit OF has a double-ring network structure made of clockwise (CW) and counter clockwise (CCW) service lines (denoted by solid lines) and protection lines (denoted by dotted lines). This kind of structure is referred to as a 4-fiber ring system.

In FIG. 1, there are a plurality (N in STM-N) of time slots each in service lines and protection lines. A plurality of communication paths can be set by the use of such time slots and the conveyed information in each communication path is time-division multiplexed. Nodes A–F drop information which is directed to lower-tier terminals connected to each node from the communication paths formed in both service lines and protection lines and add the information sent from lower-tier terminals to the communication paths formed in both service lines and protection lines.

When there is no failure in the system, the information in the service traffic is transmitted through the communication path set in the service transmission lines. Then since the protection lines PL are vacant, a communication path for sub traffic is set in the vacant protection lines PL to carry information through the protection lines. When the service traffic path is switched to the protection lines PL, the existing sub traffic path is unconditionally severed.

There is no restraint on which time slot in the service lines SL should be assigned to the service traffic path (hereafter, service path) or on which time slot in the protection lines PL should be assigned to the sub traffic communication path (hereafter, sub path). In usual cases, however, the service path is switched to the same time slot in the protection lines PL. Thus, a sub path may already exist in the protection transmission lines PL and may not yet exist in the other cases.

FIG. 2 illustrates the configuration of nodes A–F according to the present invention. As shown in FIG. 2, nodes A–F have a high speed service line interface unit (HS-I/F) 1-0 that terminates the service transmission lines SL and a high speed protection line interface unit 1-1 that terminates the protection transmission lines PL. STM-16 signals entered to the node through the high speed service line interface 1-0 and high speed protection line interface 1-1 are supplied to a time slot assignment TSA 2-0.

This time slot assignment 2-0 drops the signals time-division multiplexed with specific time slots for lower-tier terminals out of the entered STM-16 signals, and then provides the dropped signals to directed lower-tier terminals through lower-speed interfaces (LS-I/F) 3-1 to 3-*k*. The time slot assignment 2-0 intakes the signals sent from lower-tier terminals through low-speed interfaces 3-1 to 3-*k*, adds the signals to the specified time slots in the STM-16 frame to create STM-16 signals and send them to the high speed circuit OF. In nodes A–F, communication paths for service traffic and sub traffic are thereby set between arbitrary nodes by selecting time slots for the transmission of signals for lower-tier terminals.

In many cases, the multiplexing level for lower-tier group signals in the high speed circuit OF is either STM-1, STM-4, STM-0 or STM-16. However, an extended system may adopt another multiplexing level, for example STM-64.

The time slot assignment 2-0 and the other time slot assignment 2-1 are paired up for duplexing. Currently, it is assumed that the time slot assignment 2-0 is used for the service lines and the other time slot assignment 2-1 for the protection lines. Namely, they are switched inside the node as during normal operation, the time slot assignment 2-0 works and in the event of a failure in the time slot assignment 2-0 then the time slot assignment 2-1 works alternatively. The operation and configuration of the time slot assignment 2-1 are the same as those of the time slot assignment 2-0. Thus the explanation of the time slot assignment 2-1 is omitted here.

The high speed interfaces 1-0 and 1-1, time slot assignments 2-0 and 2-1, and low speed interfaces 3-1 to 3-*k* are connected to a main control unit 5 through sub-controllers 4H, 4T, 4L. The sub-controllers 4H, 4T, 4L are supplemental units that execute the processing of signals for equipment that is to be controlled, switching redundant lines, status monitoring and other jobs, in response to the control directions sent from the main control unit 5.

Based on various control programs saved in a storage unit 6, the main control unit 5 controls the operation of functions in the node and collects status monitoring information (for example, calculation of quality data of STM signals terminated by the high speed interfaces 1-0, 1-1 and low speed interfaces 3-1 to 3-*k*), for example. This main control unit is connected to a monitoring control unit (not shown) via an administrative network interface 7, sends the collected information monitoring results to the monitoring control unit, and conducts data processing that meets the requirements sent from the monitoring control unit.

In the nodes A–F of the above configuration, the switching of the service path from the service transmission lines SL to the protection transmission lines PL is conducted by tiered control made of a major control by the main control unit 5, control of the high speed interfaces 1-0, 1-1 by the sub-controllers 4H, 4T, 4L and control of the low speed interfaces 3-1 to 3-*k* by the time slot assignments 2-0, 2-1. For example, in the event of failure in the transmission lines and nodes, or at the request of redundancy switching by the monitoring control unit or a user, the target service path is switched by the switching program loaded to the main control unit 5. This function is widely known as APS in the SDH system.

In addition, nodes A–F have a timing generator 8 that receives clock signals from a digital clock supplier (DCS) inside the network and works as an operation clock inside each node and a power supply 9 that supplies electric power to function blocks.

Meanwhile, the main control unit 5 has a predetermined signals insertion means 5*a* featured by this invention, in addition to a variety of control functions such as APS described above. This predetermined signals insertion means 5*a* carries out the following operation prior to the switching of the service path based on APS. First, it decides whether a sub path has been set in the protection lines to which the service path will be switched, checking all the time slots. If a sub path has been set, the AU-AIS signal is inserted at the sub path exit to lower-tier terminals. Namely, the predetermined signals insertion means 5*a* terminates the sub path by sending the AU-AIS signal to the destination to which data is dropped in the sub path. Unless a sub path is set, it inserts the UNEQ signal at a predetermined exit to lower-tier terminals. Namely, the UNEQ signal is sent to the destination where no sub path is set but substantially connected to the protection lines for data dropping, and thereby the connection to the protection lines is severed.

The ITU-T Recommendations define a predetermined signal called UNEQ (Unequipped) to be sent to unassigned transmission lines including protection lines for the control of the status of such transmission lines. It is identified whether the transmission line is under use or not by checking the presence or absence of the UNEQ signal when setting a communication path in the transmission line. The present invention is featured by the prevention of information leak from the service path by the use of this UNEQ signal.

The predetermined signals insertion means 5*a* is a function object that can be added to the existing operation program written in a specific language and saved in the storage unit 6. It can be a patch program, for example. The insertion of the AU-AIS signal or UNEQ signal can be implemented in the low speed interfaces 3-1 to 3-*k* principally by rewriting the bit pattern of the drop signals sent to lower-tier terminals, following the operation that the predetermined signals insertion means 5*a* executes.

Figure 3:
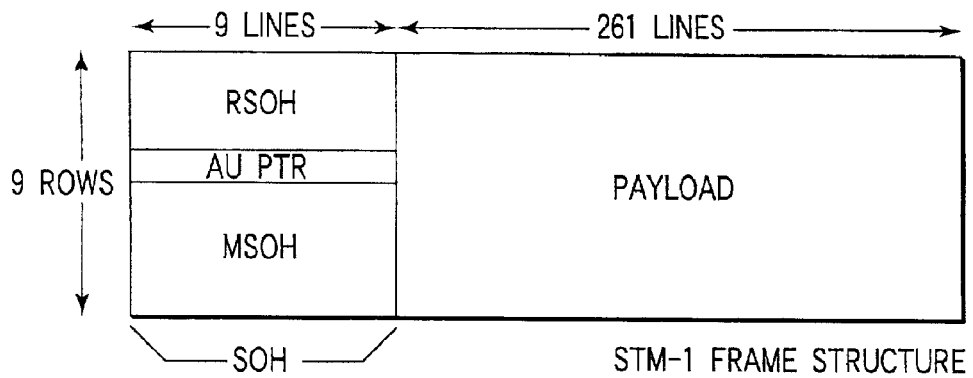
FIG. 3 is a diagram illustrating the frame format for signals running in the SDH transmission system according to the present invention.

FIG. 3 illustrates the signal frame format employed in the SDH system. The transmission signal frame of SDH consists of a header called SOH (Section Over Head) and a data holder called Payload. In the STM-1 frame shown in FIG. 3, SOH has a structure of 9-line×9-row (9-line×9-byte) and Payload has a structure of 9-line×291-row (9-line×261-byte). During the multiplexing from STM-1 to STM-N (N=4, 16, 64, for example), SOH is reconstructed according to the magnitude of N, while Payload is sequentially multiplexed on a byte basis and error correction is conducted by a method called interleaving.

Precisely described, SOH is the part except for the forth line (AU pointer: AU PTR), consisting of the top three lines of RSOH (Regenerator Section Over Head: transit section overhead) and MSOH (Multiplex Section Over Head: terminal section overhead). AU PTR represents with address in Payload the time-phase relationship between the frame defined by SOH and the frame of the information multiplexed into Payload.

Figure 4:
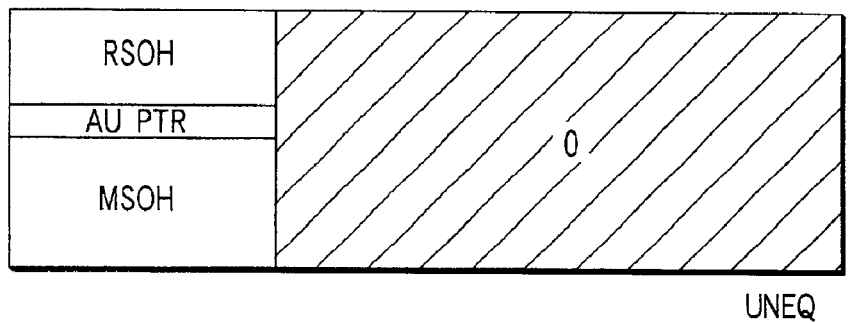
FIG. 4 is a diagram illustrating the signal pattern of the UNEQ signal for use in the SDH transmission system according to the present invention.

FIG. 4 shows the UNEQ signal pattern used in SDH. In short, UNEQ is a bit pattern that every bit in Payload in the STM-N frame is zero (0). A device that has received an STM frame where its Payload is filled with bit zero (0) recognizes that it is a UNEQ signal. Since the transmitted signals are scrambled in SDH, the zero level does not last for a long time during the transmission of UNEQ.

Figure 5:
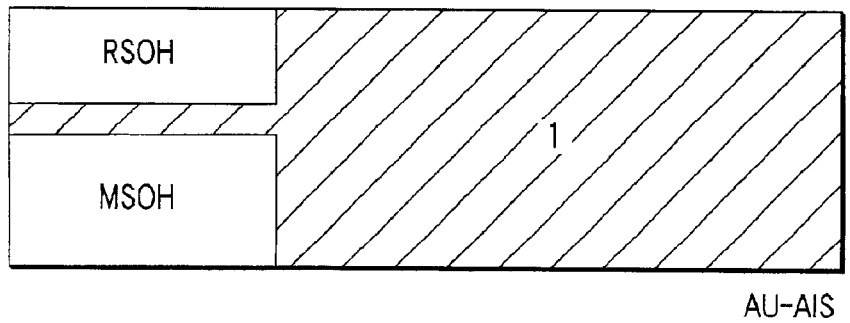
FIG. 5 is a diagram illustrating the signal pattern of the AU-AIS signal for use in the SDH transmission system according to the present invention.

FIG. 5 shows the AU-AIS signal pattern used in SDH. In short, AU-AIS is a bit pattern that every bit in Payload and AU-PTR in the STM-N frame is one (1). A device that has received an STM frame where its Payload and AU-PTR are filled with bit one (1) recognizes that it is an AU-AIS signal.

Figure 6:
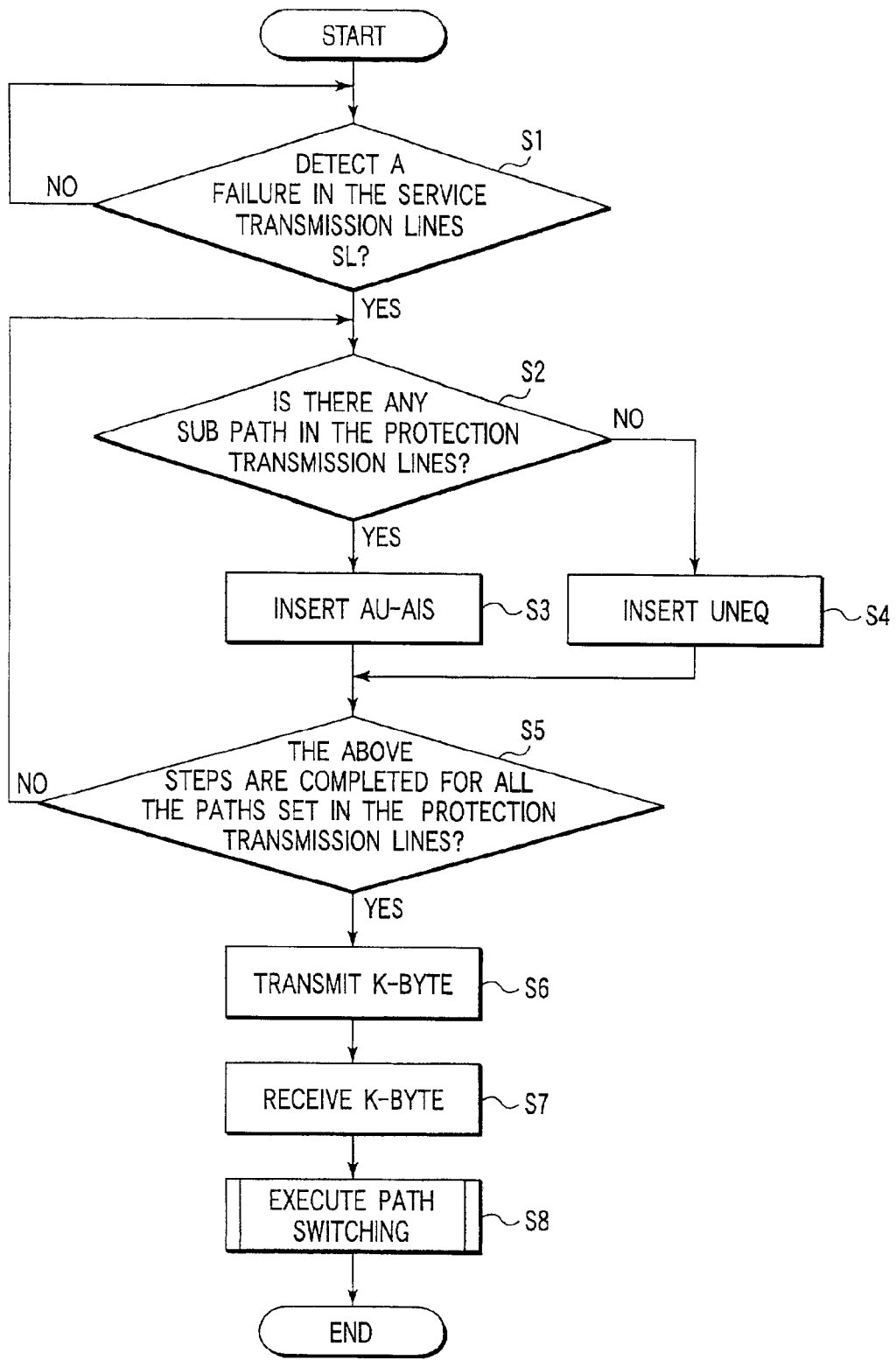
FIG. 6 is a flow chart illustrating the operations of the main control unit in each of nodes A—F in the SDH transmission system according to the present invention.

FIG. 6 is a flow chart illustrating the steps of traffic control for service path switching that is conducted in nodes A–F by the predetermined signals insertion means 5a installed in the main control unit 5. In FIG. 6, the main control unit 5 monitors the notifications sent from the high speed service line interface 1-0 and high speed protection line interface 1-1, and checks for failure in the service transmission lines SL (step S1). If a problem is detected in step S1, the main control unit 5 examines the protection transmission lines PL, checking the time slots from their top in sequence for a sub path (step S2). In the case of a problem that can be solved by switching spans, it is enough to examine only protection transmission lines existing in the problem region. On the other hand, if it is a failure that needs a link switching, the whole range of the protection transmission lines are examined for a sub path.

If a sub path is detected, the AU-AIS signal is inserted at the exit to lower-tier terminals in the communication path to sever the sub path (step S3). If there is no sub path, the UNEQ signal is inserted at every exit to lower-tier terminals (step S4). The above steps are performed on all the communication paths in the protection transmission lines that are involved in path switching (the step loop from step S2 to S5).

After the step loop from step S2 to S5 is completed, the main control unit 5 transmits/receives K-byte (at steps S6 and S7) and executes the path switching (step S8). Namely, it switches the service traffic communication path to the protection transmission lines PL, carrying out APS based on the existing operation procedures.

With regard to the above service path switching process, FIGS. 7–12 demonstrate specific examples of path setting in the current system, comparing them with conventional cases. In FIGS. 7–12, only nodes C–E are used in the explanation for simplicity, and the other nodes A, B, F are omitted.

Figure 7:
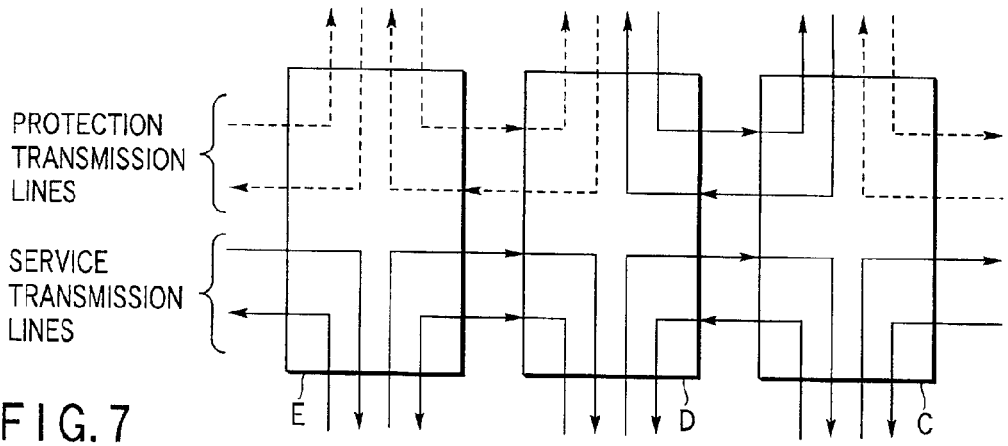
FIG. 7 is an example of the stable state of the SDH transmission system according to the present invention.

FIG. 7 shows a stable state (no failure in the network). In this diagram, the communication paths for service traffic are denoted by thin solid lines, while the communication paths for sub traffic by thick solid lines. Those paths where no sub traffic is set are denoted by dotted lines. Namely, in the normal state, the service traffic communication paths are set in all the service transmission lines, while a sub traffic communication path is set between nodes C and D in the protection transmission lines.

Figure 8:
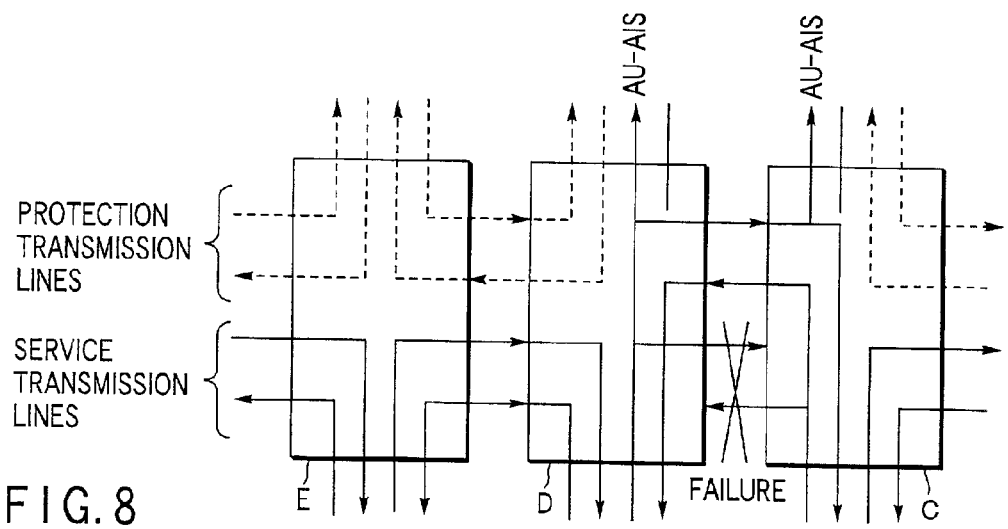
FIG. 8 is a diagram illustrating the restoration state made by the traffic control methods of the prior art and the present invention when a problem has occurred during the stable state of FIG. 7 in the service transmission line between nodes C–D.

Now suppose that the stable state of FIG. 7 is disturbed as shown in FIG. 8 by a problem that has occurred in the upload and download lines between nodes C and D in the service transmission lines. Then based on the rules defined in the ITU-T Recommendation G.841, nodes C and D first insert the AU-AIS signal at the exit to lower-tier terminals in the sub path set in the upload and download lines in the protection transmission lines to terminate the sub path. Later, the service path set in the service transmission lines is switched to the protection transmission lines. Then the information in the service traffic is successfully restored. This control method is the same as the prior-art traffic control method.

A problem in the conventional traffic control method is like what described below.

Figure 9:
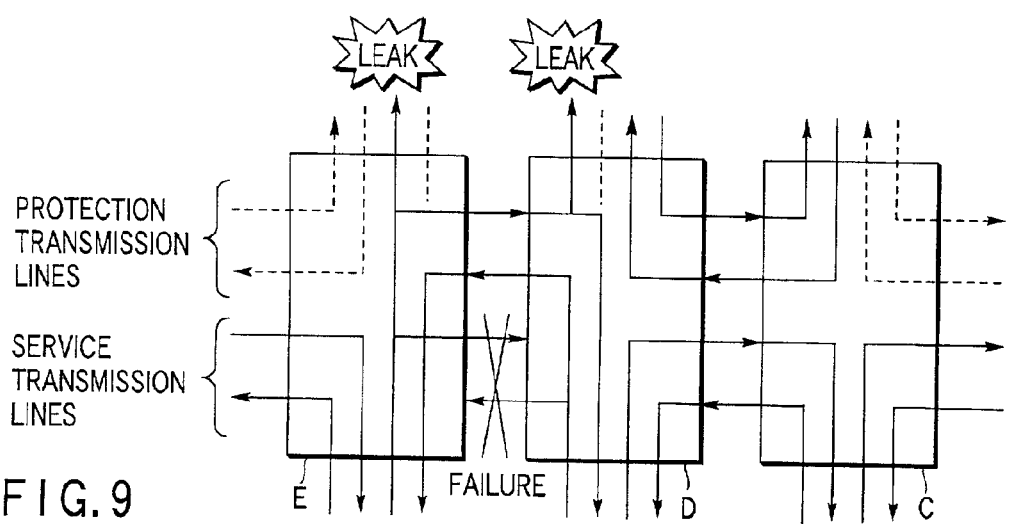
FIG. 9 is a diagram illustrating the restoration state made by the traffic control method of the prior art when a problem has occurred during the stable state of FIG. 7 in the service transmission line between nodes D–E.

Now suppose that the stable state of FIG. 7 is disturbed as shown in FIG. 9 by a problem has occurred in the upload and download lines between nodes D and E in the service transmission lines. In this case, since there is no sub path set in the upload or download lines in the protection transmission lines, the service path is switched to the protection transmission lines with no special preparations.

Then the path connection inside node E is changed as shown in FIG. 9. At this moment, there is a fear that in nodes D and E the service traffic information sent from the service lines to node E may leak to lower-tier terminals existing on the protection line side where no sub path has been set, before the transmitted information is taken out in node D from the service lines.

Figure 10:
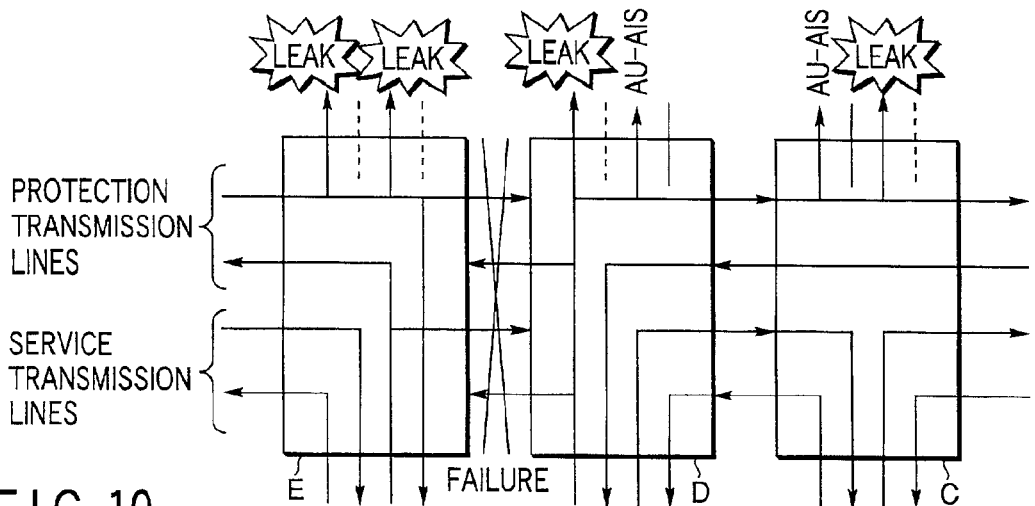
FIG. 10 is a diagram illustrating the restoration state made by the traffic control method of the prior art when a problem has occurred during the stable state of FIG. 7 in both the service and protection transmission lines between nodes D–E at the same time.

Further, a more serious problem arises if both service and protection transmission lines have failed in the same region. For example, suppose that the stable state of FIG. 7 is disturbed and both service and protection transmission lines have failed between nodes D and E, as shown in FIG. 10. In this case, based on the rules defined in the ITU-T Recommendation G.841, nodes C and D first insert the AU-AIS signal at the exit to lower-tier terminals in the sub path set in the upload and download lines in the protection transmission lines to terminate the sub path. Later, the service path that was set between nodes D and E is switched to the protection transmission lines, exchanging the upload and download lines. As a result, the service traffic information inserted from the service line side to node D is carried to the direction opposite to the normal direction through the protection transmission lines to arrive at node E.

In this case, if the conventional method is adopted, no special operation is done to the lines where no sub path has been set. Thus there is a fear that in all the nodes including node D the service traffic information sent from the service lines to node D may leak to lower-tier terminals existing on the protection line side where no sub path has been set, before the transmitted information is taken out in node E from the service lines.

The traffic control according to the present invention, which is adopted in the case of failures shown in FIGS. 9 and 10, is described with reference to FIGS. 11 and 12.

Figure 11:
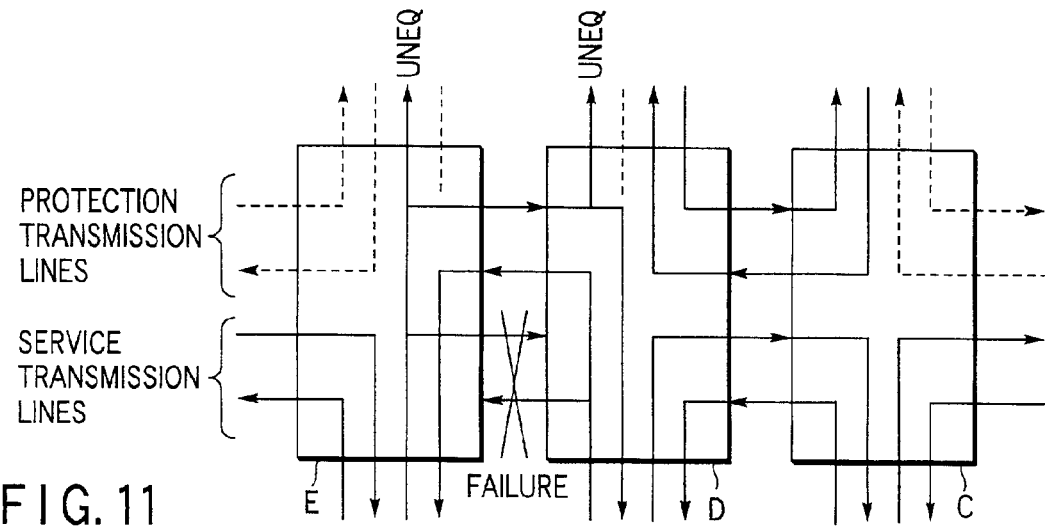
FIG. 11 is a diagram illustrating the restoration state made by the traffic control method of the present invention when a problem has occurred during the stable state of FIG. 7 in the service transmission line between nodes D–E.

FIG. 11 demonstrates the restoration state made by the present invention for the case of the failure shown in FIG. 9. In the traffic control method according to the present invention, the UNEQ signal is inserted at the exit to lower-tier terminals where no sub path has been set, as shown in FIG. 11. As a result, the prevention of a leak of service traffic information is ensured.

Figure 12:
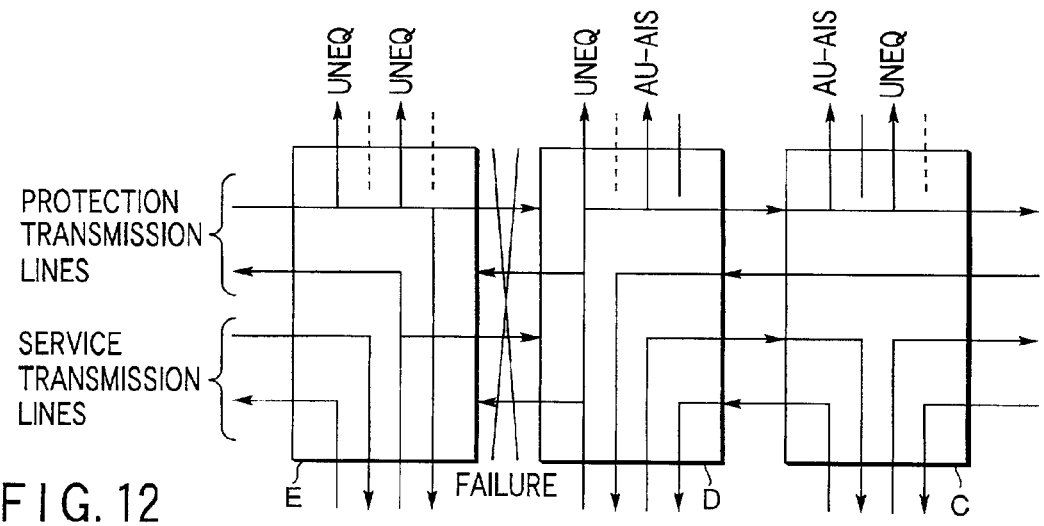
FIG. 12 is a diagram illustrating the restoration state made by the traffic control method of the present invention when a problem has occurred during the stable state of FIG. 7 in both the service and protection transmission lines between nodes D–E at the same time.

FIG. 12 shows the restoration state made by the present invention for the case of the failure shown in FIG. 10. In the traffic control method according to the present invention, the AU-AIS signal is inserted in the same way as that shown in FIG. 10, while in FIG. 12 the UNEQ signal is inserted at every exit to lower-tier terminals where no sub path has been set. As a result, the prevention of a leak of service traffic information is ensured as the case of FIG. 11.

As described above, in the present embodiment of the invention, during the switching of the communication path set in the service transmission lines carrying the service traffic to the protection transmission lines in the event of failure, if a communication path has been set in the protection transmission lines PL for sub traffic, the AU-AIS signal is inserted at the exit to lower-tier terminals in the communication path in order to terminate the communication path of the sub traffic. Unless a communication path has been set for sub traffic, the UNEQ signal is inserted at every exit to lower-tier terminals in order to terminate the connection which has been set up between the service path and lower-tier terminals that are substantially coupled with the protection transmission lines.

As a result, even if a connection pattern leading to a misconnect during APS switching is formed, the information added to the service traffic at the exit to lower-tier terminals in the node is rewritten into the AU-AIS or UNEQ bit pattern. Then the service traffic information no longer makes sense when it is received by lower-tier terminals to which this information has not been directed. The prevention of a leak of service traffic information is thereby ensured.

Further, in the present invention, the AU-AIS signal is inserted at the exit to lower-tier terminals where a sub path has been set, while the UNEQ signal is inserted at the exit to lower-tier terminals where no sub path has been set. As a result, the lower-tier terminals accommodated in the node easily recognize the current state of the node.

Further, in the present invention, the conventional insertion of the AU-AIS and UNEQ signals are made by in principle sending commands from the main control unit 5 to the low speed interfaces 3-1 to 3-k. Therefore, there is no need of adding hardware to the exit to lower-tier terminals in the communication path, for the implementation of ideas provided in the present invention. As a result, the existing system configuration can also be used in the present invention.

Although the present invention has been described in connection with the preferred embodiment, the invention is not limited only to the above embodiment.

For example, the present invention can be applied to systems where a plurality of nodes are connected in the form of a chain, although a 4-fiber ring system has been exemplified in the above embodiment.

Further, the above embodiment has been explained for SDH but the present invention can be applied to SONET, which has a similar system configuration.

In addition, the present invention can be applied to systems that re-establish the sub traffic communication path after the service path has been switched, although the above embodiment did not describe the operation to be performed after the service traffic communication path has been switched.

In the above embodiment, the AU-AIS and UNEQ signals have been employed as predetermined signals. However, other predetermined signals can be used if they are recognizable at each communication device.

Although only a single embodiment of the invention has been described, it will be apparent to a person skilled in the art that various modifications to the details of construction shown and described may be made without departing from the scope of this invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information transmission network system comprising:
   a plurality of node units each accommodating at least one lower-tier terminal, and
   service transmission lines and protection transmission lines interconnecting said node units;
   wherein said node units comprise;
   a normal operating means for transmitting information in the main traffic by setting a main traffic communication path in said service transmission lines and transmits information in the sub-traffic by setting a sub-traffic communication path, if necessary, in said protection transmission lines,
   a failure detection means for detecting failure in said service transmission lines, and
   a backup operating means for inserting a predetermined signal, when a failure has been detected by said detection means, at every exit to lower-tier terminals substantially connected to said protection transmission lines and then switches the main traffic communication path set in the failed service transmission lines to said protection transmission lines;
   wherein the backup operating means in said node units inserts a first predetermined signal at the exit to lower-tier terminals where said sub-traffic communication path is set and inserts a second predetermined signal, which is different from said first predetermined signal, at the exit to lower-tier terminals where no sub-traffic communication path is set;
   wherein the
   backup operating means in said node units inserts the AU-AIS signal (Administrative Unit-Alarm Indication Signal) as said first predetermined signal and the UNEQ (Unequipped) signal as said second signal, when said information transmission network system has a configuration conforming to SDH (Synchronous Digital Hierarchy).

2. A traffic control method for use in network systems having a plurality of node units each accommodating at least one lower-tier terminal and service transmission lines and protection transmission lines interconnecting said node units, comprising:
   a step of detecting failure in said service transmission lines;
   a step of normal operation that, when no failure is detected in said failure detection step, transmits information in the main traffic by setting a main traffic communication path in said service transmission lines and transmits information in the sub-traffic by setting a sub-traffic communication path, if necessary, in said protection transmission lines;

a step of backup operation that, when a failure is detected in said failure detection step, inserts a predetermined signal at the exit to lower-tier terminals substantially connected to said protection transmission lines; and a step of switching the main traffic communication path set in the failed service transmission lines to said protection transmission lines, after said predetermined signal has been inserted;

wherein said step of inserting a predetermined signal comprises:

a step of checking the protection transmission lines corresponding to the service transmission lines where a failure has been detected in said failure detection step for any sub-traffic communication path; and a step of inserting a predetermined signal that, when a sub-traffic communication path is detected in said failure detection step, inserts a first predetermined signal at the exit of the sub-traffic communication path to lower-tier terminals, and when no sub-traffic communication path is detected in said failure detection step, inserts a second predetermined signal at the exit to lower-tier terminals substantially connected to said protection transmission lines;

wherein said steps of inserting a predetermined signal inserts the AU-AIS signal (Administrative Unit-Alarm Indication Signal) as said first predetermined signal and the UNEQ (Unequipped) signal as said second predetermined signal, when said information transmission network system has a configuration conforming to SDH (Synchronous Digital Hierarchy).

3. In node units for use in information transmission network systems that have a plurality of node units each accommodating at least one lower-tier terminal, connect node units with service transmission lines and protection transmission lines, during normal operations, carry main traffic information through a main traffic communication path set in said service transmission lines, and carry sub-traffic information through a sub-traffic communication path, if necessary, set in said protection transmission lines, the node unit comprising:

a transmitted information exchange unit that transmits and receives information through a predetermined communication path selectively between said service transmission lines and protection transmission lines;

at least one interface unit for said lower-tier terminals that is each mounted in said at least one lower-tier terminal and transmits and receives information between the corresponding lower-tier terminals and said transmitted information exchange unit; and a control unit that monitors said service transmission lines and protection transmission lines for failure, and, upon the detection of failure in said service transmission lines, terminates the communication path substantially connected to said protection transmission lines by making said interface unit for lower-tier terminals send predetermined signals to lower-tier terminals and then makes said transmitted information exchange unit switch the main traffic communication path to the protection transmission lines;

wherein said control unit has:

a sub-traffic communication path detection means for checking the protection transmission lines corresponding to the service transmission lines where a failure has been detected in said failure detection step for any sub-traffic communication path; and a predetermined signals insertion means for making the interface unit for lower-tier terminals that serves as the exit of the corresponding path to lower-tier terminals send a first predetermined signal to lower-tier terminals when a sub-traffic communication path is detected by said detection means, and for making the interface unit for lower-tier terminals that serves as the exit to lower-tier terminals substantially connected to said protection transmission lines send a second predetermined signal to lower-tier terminals when no sub-traffic communication path is detected;

wherein said predetermined signal insertion means sends the AU-AIS signal (Administrative Unit-Alarm Indication Signal) as said first predetermined signal and the UNEQ (Unequipped) signal as said second signal, when said information transmission network system has a configuration conforming to SDH (Synchronous Digital Hierarchy).

* * * * *